United States Patent
Ray et al.

(10) Patent No.: US 11,388,443 B2
(45) Date of Patent: Jul. 12, 2022

(54) HARMONIZATION OF DEBLOCKING CONDITIONS IN VIDEO CODING

(71) Applicant: QUALCOMM Incorporated, San Diego, CA (US)

(72) Inventors: Bappaditya Ray, La Jolla, CA (US); Geert Van der Auwera, Del Mar, CA (US); Marta Karczewicz, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 5 days.

(21) Appl. No.: 17/024,458

(22) Filed: Sep. 17, 2020

(65) Prior Publication Data

US 2021/0084341 A1 Mar. 18, 2021

Related U.S. Application Data

(60) Provisional application No. 62/902,122, filed on Sep. 18, 2019.

(51) Int. Cl.
*H04N 19/82* (2014.01)
*H04N 19/176* (2014.01)
*H04N 19/186* (2014.01)

(52) U.S. Cl.
CPC .......... *H04N 19/82* (2014.11); *H04N 19/176* (2014.11); *H04N 19/186* (2014.11)

(58) Field of Classification Search
CPC .. H04N 19/117; H04N 19/157; H04N 19/176; H04N 19/186; H04N 19/82
See application file for complete search history.

(56) References Cited

U.S. PATENT DOCUMENTS

| 2015/0365671 A1* | 12/2015 | Pu | H04N 19/117 |
| | | | 375/240.03 |
| 2015/0365695 A1* | 12/2015 | Pu | H04N 19/186 |
| | | | 375/240.16 |
| 2020/0213596 A1* | 7/2020 | Xu | H04N 19/149 |

(Continued)

OTHER PUBLICATIONS

Bossen F., et al., "JVET Common Test Conditions and Software Reference Configurations for SDR Video", Joint Video Experts Team (JVET) of ITU-T SG 16 WP 3 and ISO/IEC14 UTC 1/5C 29/WG 11, 14th Meeting: Geneva, CH, Mar. 19-27, 2019, JVET-N1010-v1, pp. 1-6.

(Continued)

*Primary Examiner* — Md N Haque
(74) *Attorney, Agent, or Firm* — Shumaker & Sieffert, P.A.

(57) ABSTRACT

A video coder determines whether a coding mode of a first block of the video data is in a set of applicable coding modes. The set of applicable coding modes includes at least one of a block-based delta pulse code modulation mode, a transform skip mode, or a palette mode. The video coder determines whether a coding mode of a second block of the video data is in the set of applicable coding modes, wherein the second block is adjacent to the first block. The video coder determines that a deblocking filter is disabled for a color component of at least one of the first block or the second block based on at least one of: the coding mode of the first block being in the set of applicable coding modes or the coding mode of the second block being in the set of applicable coding modes.

27 Claims, 9 Drawing Sheets

(56) References Cited

U.S. PATENT DOCUMENTS

2020/0275121 A1* 8/2020 Zhao .................. H04N 19/64

OTHER PUBLICATIONS

Gross B., et al., "Versatile Video Coding (Draft 6)", 127. MPEG and 15th JVET Meeting, Jul. 3, 2019-Jul. 12, 2019, Gothenburg, (Motion Picture Expert Group or JVET of ISO/IEC JTC1/SC29/WG11 and ITU-T SG 16 WP 3), No. m49908, JVET-O2001-vE, Jul. 15, 2019 (Jul. 15, 2019), XP030208562, 455 Pages, Retrieved from the Internet: URL: http://phenix.int-evry.fr/mpeg/doc_end_user/documents/127_Gothenburg/wg11/m49908-JVET-O2001-v8-JVET-O2001-v8.zip JVET-O2001-v8.docx [retrieved on Jul. 15, 2019].

Chao Y-H., et al., "CE8-2.1: Palette Mode in HEVC", JVET-O0119, 15th JVET Meeting, Jul. 3, 2019-Jul. 12, 2019, Gothenburg, (The Joint Video Exploration Team of ISO/IEC JTC1/SC29/WG11 and ITU-TSG.16), No. JVET-O0119, Jul. 9, 2019 (Jul. 9, 2019), XP030218670, 7 Pages, Retrieved from the Internet: URL: http://phenix.int-evry.fr/jvet/doc_end_user/documents/15_Gothenburg/wg11/JVET-O0119-v3.zip JVET-O0119-v3/JVET-O0119-WD-v2.docx, JVET-O0119-V3, [retrieved on Jul. 9, 2019].

Chen J., et al., "Algorithm Description of Joint Exploration Test Model 1", 1. JVET Meeting, Oct. 19-21, 2015, Geneva (The Joint Video Exploration Team of ISO/IEC JTC1/SC29/WG11 and ITU-T SG.16 WP 3), URL: http://phenix.int-evry.fr/jvet/, No. JVET-A1001, Feb. 24, 2016 (Feb. 25, 2016), XP030150000, 27 Pages.

ITU-T H.265, Series H: Audiovisual and Multimedia Systems, Infrastructure of Audiovisual Services—Coding of Moving Video, High Efficiency Video Coding, The International Telecommunication Union, Jun. 2019, 696 Pages.

Karczewicz, M., et al., "CE8-related: Quantized Residual BDPCM", JVET-N0413-r3, Joint Video Experts Team (JVET) of ITU-T SG 16 WP 3 and ISO/IEC JTC 1/SC 29/WG 11, 14th Meeting, Geneva, CH, Mar. 19-27, 2019, pp. 1-6.

Mrak M., et al., "Improving Screen Content Coding in HEVC by Transform Skipping", Signal Processing Conference (EUSIPCO), 2012 Proceedings of the 20th European, IEEE, Aug. 27, 2012 (Aug. 27, 2012), XP032254679, pp. 1209-1213, ISBN: 978-1-4673-1068-0.

Norkin A., et al., "HEVC Deblocking Filter", IEEE Transactions on Circuits and Systems for Video Technology, Dec. 1, 2012 Dec. 1, (2012), vol. 22, No. 12, pp. 1746-1754, XP011487156.

Ray B., et al., "Non-CE5/AHG-11: Boundary Strength Harmonization for BDPCM, TS, Palette and IBC", JVET-P0611-v1, Joint Video Experts Team (JVET) of ITU-T SG 16 WP 3 and ISO/IEC JTC 1/SC 29/WG 11, 16th Meeting, Geneva, CH, Oct. 1-11, 2019, pp. 1-9.

Xu X., et al., "Description of Core Experiment 8 (CE8): 4:4:4 Screen Content Coding Tools", JVET-O2028-v1, Joint Video Experts Team (JVET) of ITU-T SG 16 WP 3 and ISO/IEC JTC 1/SC 29/WG 11, 15th Meeting: Gothenburg, SE, Jul. 3-12, 2019, pp. 1-7.

Iwamura S., et al., "Non-CE5: Boundary Strength Derivation of Deblocking Filter for Transform-Skipped Block", JVET-O0656, Joint Video Experts Team (JVET) of ITU-T SG 16 WP 3 and ISO/IEC JTC 1/SC 29/WG 11, 15th Meeting, Gothenburg, SE, Jul. 3-12, 2019, pp. 1-6.

* cited by examiner

HARMONIZATION OF DEBLOCKING CONDITIONS IN VIDEO CODING

This application claims the benefit of U.S. Provisional Patent Application 62/902,122, filed Sep. 18, 2019, the entire content of which is incorporated by reference.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes example techniques that may harmonize deblocking conditions for blocks. For instance, this disclosure describes example techniques that may harmonize deblocking conditions for blocks that have coding modes that involve skipping of a transform stage. Lack of harmonization of the deblocking conditions may lead to increase complexity in video encoders and video decoders. Moreover, in some examples, harmonizing the deblocking conditions for two or more of a block-based delta pulse code modulation (BDPCM) mode, a transform skip mode, or a palette mode, may increase compression efficiency for video data.

In one example, this disclosure describes a method of coding video data, the method comprising: determining whether a coding mode of a first block of the video data is in a set of applicable coding modes, wherein the set of applicable coding modes includes at least one of a block-based delta pulse code modulation (BDPCM) mode, a transform skip mode, or a palette mode; determining whether a coding mode of a second block of the video data is in the set of applicable coding modes, wherein the second block is adjacent to the first block; and determining that a deblocking filter is disabled for a color component of at least one of the first block or the second block based on at least one of: the coding mode of the first block being in the set of applicable coding modes or the coding mode of the second block being in the set of applicable coding modes.

In another example, this disclosure describes a device for coding video data, the device comprising: a memory to store the video data; and one or more processors implemented in circuitry, the one or more processors configured to: determine whether a coding mode of a first block of the video data is in a set of applicable coding modes, wherein the set of applicable coding modes includes at least one of a block-based delta pulse code modulation (BDPCM) mode, a transform skip mode, or a palette mode; determine whether a coding mode of a second block of the video data is in the set of applicable coding modes, wherein the second block is adjacent to the first block; and determine that a deblocking filter is disabled for a color component of at least one of the first block or the second block based on at least one of: the coding mode of the first block being in the set of applicable coding modes or the coding mode of the second block being in the set of applicable coding modes.

In another example, this disclosure describes a device for coding video data, the device comprising: means for determining whether a coding mode of a first block of the video data is in a set of applicable coding modes, wherein the set of applicable coding modes includes at least one of a block-based delta pulse code modulation (BDPCM) mode, a transform skip mode, or a palette mode; means for determining whether a coding mode of a second block of the video data is in the set of applicable coding modes, wherein the second block is adjacent to the first block; and means for determining that a deblocking filter is disabled for a color component of at least one of the first block or the second block based on at least one of: the coding mode of the first block being in the set of applicable coding modes or the coding mode of the second block being in the set of applicable coding modes.

In another example, this disclosure describes a computer-readable storage medium having stored thereon instructions that, when executed, cause one or more processors to: determine whether a coding mode of a first block of the video data is in a set of applicable coding modes, wherein the set of applicable coding modes includes at least one of a block-based delta pulse code modulation (BDPCM) mode, a transform skip mode, or a palette mode; determine whether a coding mode of a second block of the video data is in the set of applicable coding modes, wherein the second block is adjacent to the first block; and determine that a deblocking filter is disabled for a color component of at least one of the first block or the second block based on at least one of: the coding mode of the first block being in the set of applicable coding modes or the coding mode of the second block being in the set of applicable coding modes.

The details of one or more examples are set forth in the accompanying drawings and the description below. Other features, objects, and advantages will be apparent from the description, drawings, and claims.

DETAILED DESCRIPTION

Figure 1:
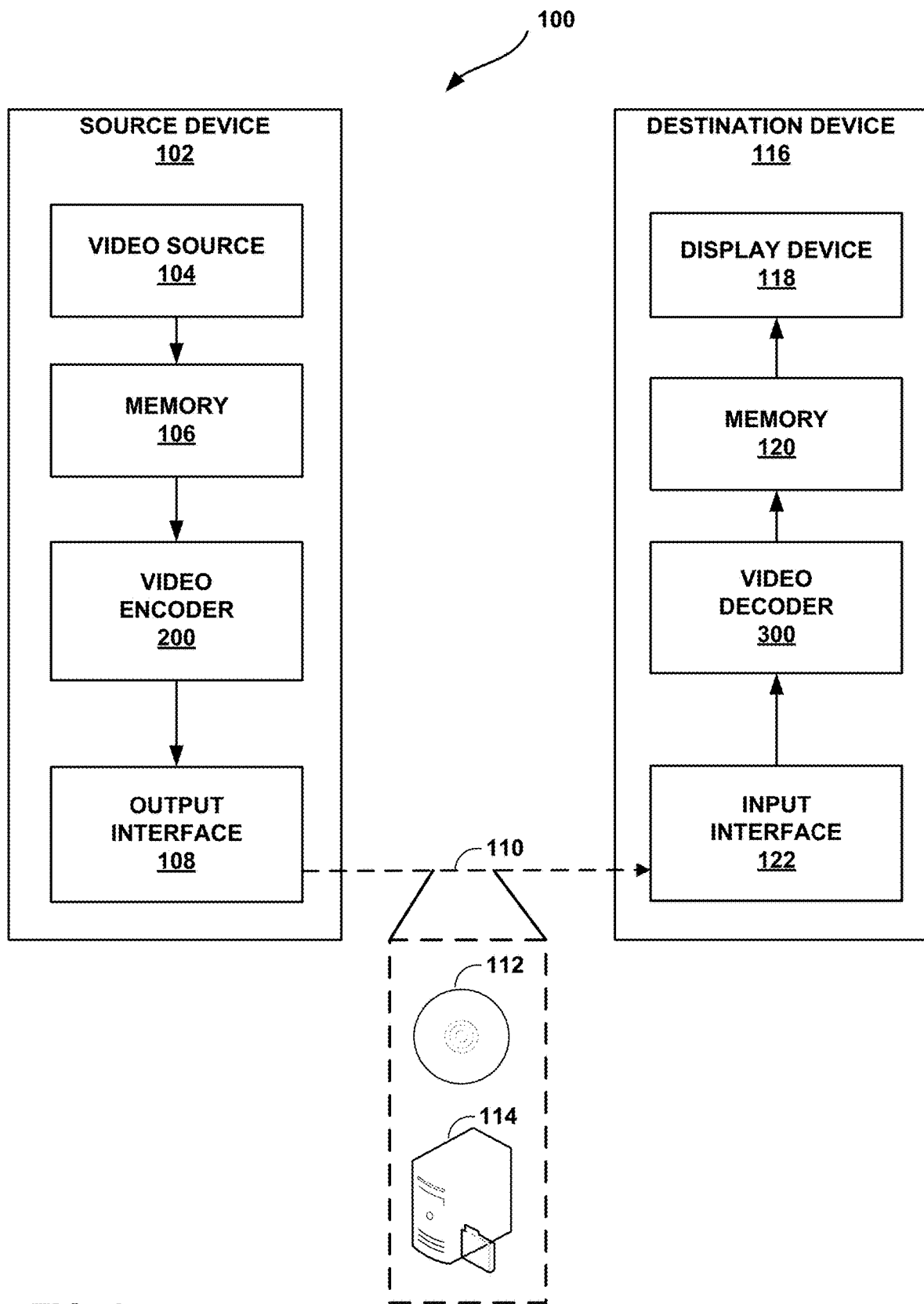
FIG. 1 is a block diagram illustrating an example video encoding and decoding system that may perform the techniques of this disclosure.

Deblocking filters are used in video coding to reduce the appearance of undesirable blocking artifacts at the boundaries between blocks. However, the use of deblocking filters can reduce the crispness of certain types of pictures, especially screen content images. Moreover, deblocking filters can reduce picture quality when the differences in sample values along a boundary between two blocks is small. Accordingly, deblocking filters should not be used in all situations.

Specific types of coding modes are commonly used with screen content pictures. For example, transform skip mode, quantized residual domain block-based delta pulse code modulation (BDPCM) mode, palette mode, and lossless coding mode are commonly used when coding screen content pictures. In the emerging Versatile Video Coding (VVC) standard, different conditions are used for disabling the deblocking filter when each of these coding modes is used. For example, when the blocks on both sides of a block boundary are coded using BDPCM mode, the deblocking filter is turned off for the block boundary. Otherwise, if zero or one of the blocks is coded using BDPCM mode, the deblocking filter may still be applied. Furthermore, in this example, when either one of the blocks is coded using palette mode, the block coded using palette mode is not filtered. Such differences in determining whether to apply the deblocking filter may increase the complexity of video coders, such as video encoders and video decoders. For instance, a video coder may need to include extra circuitry and/or store extra software to evaluate the different conditions for the different coding modes. Moreover, in some examples, the differences may reduce compression efficiency.

In accordance one or more techniques of this disclosure, a video coder (e.g., a video encoder or a video decoder) may determine whether a coding mode of a first block of the video data is in a set of applicable coding modes, wherein the set of applicable coding modes includes at least one of a BDPCM mode, a transform skip mode, a palette mode, or a lossless mode. Furthermore, the video coder may determine whether a coding mode of a second block of the video data is in the set of applicable coding modes. The second block is adjacent to the first block. The video coder may determine that a deblocking filter is disabled for a color component of at least one of the first block or the second block based on at least one of: the coding mode of the first block being in the set of applicable coding modes or the coding mode of the second block being in the set of applicable coding modes.

In the applicable modes (e.g., BDPCM, transform skip and palette, skip transform stages), the natures of the residual are very similar to each other (and they are different from the transform coded blocks). Therefore, it is reasonable that these different modes should be deblocked in the same way. For these applicable modes it is often observed that a significant amount of residual energy (or details) may be located at the boundary, and deblocking may harm or remove those important details. So, such differences in deblocking condition may not be reasonable and may even decrease the coding efficiency.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, unencoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may comprise any of a wide range of devices, including desktop computers, notebook (i.e., laptop) computers, tablet computers, set-top boxes, telephone handsets such as smartphones, televisions, cameras, display devices, digital media players, video gaming consoles, video streaming device, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques that harmonize deblocking conditions for blocks that have coding modes that involve skipping of a transform stage. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than include an integrated display device.

System 100 as shown in FIG. 1 is merely one example. In general, any digital video encoding and/or decoding device may perform techniques that harmonize deblocking conditions for blocks that have coding modes that involve skipping of a transform stage. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, source device 102 and destination device 116 may operate in a substantially symmetrical manner such that each of source device 102 and destination device 116 includes video encoding and decoding components. Hence, system 100 may support one-way or two-way video transmission between source device 102 and destination device 116, e.g., for video streaming, video playback, video broadcasting, or video telephony.

In general, video source 104 represents a source of video data (i.e., raw, unencoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some examples, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although memory 106 and memory 120 are shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, computer-readable medium 110 may include storage device 112. Source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, computer-readable medium 110 may include file server 114 or another intermediate storage device that may store the encoded video data generated by source device 102. Source device 102 may output encoded video data to file server 114 or another intermediate storage device that may store the encoded video generated by source device 102. Destination device 116 may access stored video data from file server 114 via streaming or download. File server 114 may be any type of server device capable of storing encoded video data and transmitting that encoded video data to the destination device 116. File server 114 may represent a web server (e.g., for a website), a File Transfer Protocol (FTP) server, a content delivery network device, or a network attached storage (NAS) device. Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on file server 114. File server 114 and input interface 122 may be configured to operate according to a streaming transmission protocol, a download transmission protocol, or a combination thereof.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., a communication medium, storage device 112, file server 114, or the like). The encoded video bitstream may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a cathode ray tube (CRT), a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream. If applicable, MUX-DEMUX units may conform to the ITU H.223 multiplexer protocol, or other protocols such as the user datagram protocol (UDP).

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may comprise an integrated circuit, a microprocessor, and/or a wireless communication device, such as a cellular telephone.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as ITU-T H.266, also referred to as Versatile Video Coding (VVC). A recent draft of the VVC standard is described in Bross, et al. "Versatile Video Coding (Draft 6)," Joint Video Experts Team (JVET) of ITU-T SG 16 WP 3 and ISO/IEC JTC 1/SC 29/WG 11, 15th Meeting: Gothenburg, SE, 3-12 Jul. 2019, JVET-O2001-vE (hereinafter "VVC Draft 6"). The techniques of this disclosure, however, are not limited to any particular coding standard.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to VVC. According to VVC, a video coder (such as video encoder 200) partitions a picture into a plurality of coding tree units (CTUs). Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree (QT) partition, a binary tree (BT) partition, and one or more types of triple tree (TT) (also called ternary tree (TT)) partitions. A triple or ternary tree partition is a partition where a block is split into three sub-blocks. In some examples, a triple or ternary tree partition divides a block into three sub-blocks without dividing the original block through the center. The partitioning types in MTT (e.g., QT, BT, and TT), may be symmetrical or asymmetrical.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning per HEVC, QTBT partitioning, MTT partitioning, or other partitioning structures. For purposes of explanation, the description of the techniques of this disclosure is presented with respect to QTBT partitioning. However, it should be understood that the techniques of this disclosure may also be applied to video coders configured to use quadtree partitioning, or other types of partitioning as well.

The blocks (e.g., CTUs or CUs) may be grouped in various ways in a picture. As one example, a brick may refer to a rectangular region of CTU rows within a particular tile in a picture. A tile may be a rectangular region of CTUs within a particular tile column and a particular tile row in a picture. A tile column refers to a rectangular region of CTUs having a height equal to the height of the picture and a width specified by syntax elements (e.g., such as in a picture parameter set). A tile row refers to a rectangular region of CTUs having a height specified by syntax elements (e.g., such as in a picture parameter set) and a width equal to the width of the picture.

In some examples, a tile may be partitioned into multiple bricks, each of which may include one or more CTU rows within the tile. A tile that is not partitioned into multiple bricks may also be referred to as a brick. However, a brick that is a true subset of a tile may not be referred to as a tile.

The bricks in a picture may also be arranged in a slice. A slice may be an integer number of bricks of a picture that may be exclusively contained in a single network abstraction layer (NAL) unit. In some examples, a slice includes either a number of complete tiles or only a consecutive sequence of complete bricks of one tile.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may comprise N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Some examples of VVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. Some examples of VVC provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the transform coefficients, providing further compression. By performing the quantization process, video encoder 200 may reduce the bit depth associated with some or all of the transform coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) transform coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information for partitioning a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block.

Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

A bitstream may comprise a sequence of network abstraction layer (NAL) units. A NAL unit is a syntax structure containing an indication of the type of data in the NAL unit and bytes containing that data in the form of a raw byte sequence payload (RBSP) interspersed as necessary with emulation prevention bits. Each of the NAL units may include a NAL unit header and may encapsulate a RB SP. The NAL unit header may include a syntax element indicating a NAL unit type code. The NAL unit type code specified by the NAL unit header of a NAL unit indicates the type of the NAL unit. A RB SP may be a syntax structure containing an integer number of bytes that is encapsulated within a NAL unit. In some instances, an RBSP includes zero bits.

As noted above, a bitstream may include a representation of encoded pictures of the video data and associated data. The associated data may include parameter sets. NAL units may encapsulate RBSPs for video parameter sets (VPSs), sequence parameter sets (SPSs), and picture parameter sets (PPSs). A VPS is a syntax structure comprising syntax elements that apply to zero or more entire coded video sequences (CVSs). An SPS is also a syntax structure comprising syntax elements that apply to zero or more entire CVSs. An SPS may include a syntax element that identifies a VPS that is active when the SPS is active. Thus, the syntax elements of a VPS may be more generally applicable than the syntax elements of an SPS. A PPS is a syntax structure comprising syntax elements that apply to zero or more coded pictures. A PPS may include a syntax element that identifies an SPS that is active when the PPS is active. A slice header of a slice may include a syntax element that indicates a PPS that is active when the slice is being coded.

In accordance with the techniques of this disclosure, a video coder (e.g., video encoder 200 or video decoder 300) may determine whether a coding mode of a first block of the video data is in a set of applicable coding modes. The set of applicable coding modes may include at least one of a block-based delta pulse code modulation (BDPCM) mode, a transform skip mode, a palette mode, or a lossless mode. Additionally, the video coder may determine whether a coding mode of a second block of the video data is in the set of applicable coding modes. The second block is adjacent to the first block. The video coder may determine that a deblocking filter is disabled for a color component of at least one of the first block or the second block based on at least one of: the coding mode of the first block being in the set of applicable coding modes or the coding mode of the second block being in the set of applicable coding modes.

This disclosure may generally refer to "signaling" certain information, such as syntax elements. The term "signaling" may generally refer to the communication of values for syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

Like previous video coding standards, the VVC standard is based on a hybrid coding scheme using block-based prediction and transform coding. For the block-based prediction and transform coding scheme, discontinuities can occur in the reconstructed signal at the block boundaries. This is because the coding blocks are non-overlapped in nature, are transformed and quantized, and neighboring coding blocks may use different coding methods. Visible discontinuities at the block boundaries are known as blocking artifacts. See e.g., Norkin, A., Bjontegaard, G., Fuldseth, A., Narroschke, M., Ikeda, M., Andersson, K., Zhou, M., Van der Auwera, G., "HEVC deblocking filter", IEEE Transactions on Circuits and Systems for Video Technology, December 2012.

Figure 2:
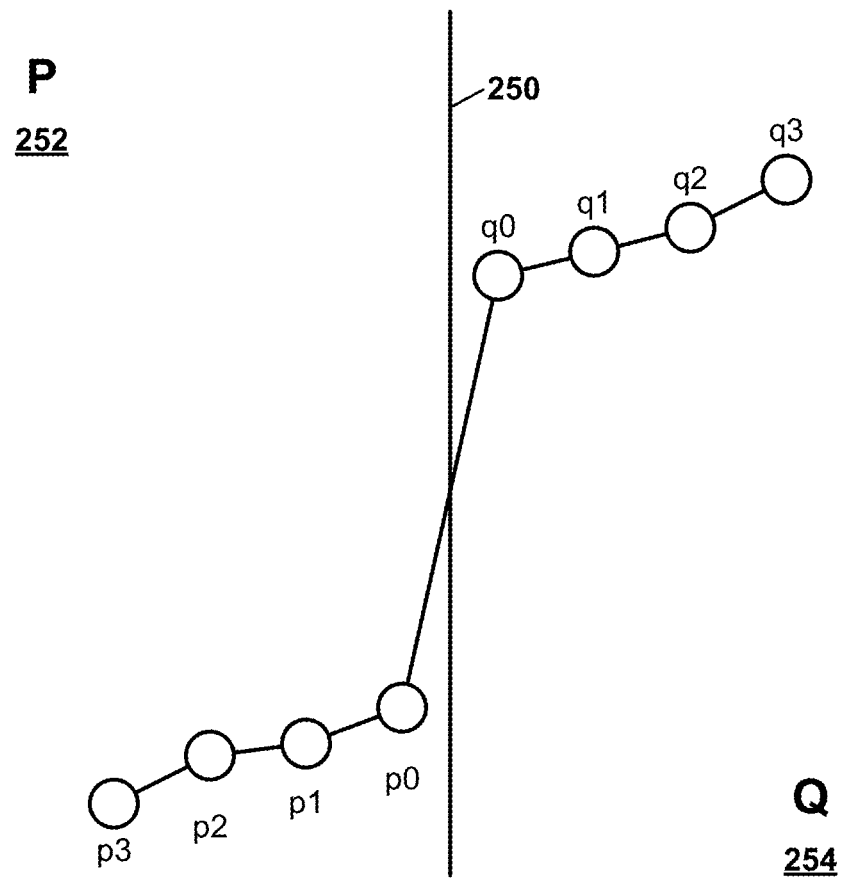
FIG. 2 is a conceptual diagram illustrating an example of a discontinuity across a block boundary between a block P and a block Q.

FIG. 2 is a conceptual diagram illustrating an example of a discontinuity across a block boundary 250 between a block P (252) and a block Q (254). As shown in the example of FIG. 2, block P (252) includes samples p3, p2, p1, and p0. Block Q (254) includes samples q0, q1, q2, and q3. Samples p3, p2, p1, p0, q0, q1, q2, and q3 may correspond to a single row or column of samples in a picture. However, in the example of FIG. 2, the vertical positions of samples p3, p2, p1, p0, q0, q1, q2, and q3 correspond to the numerical values of samples p3, p2, p1, p0, q0, q1, q2, and q3.

Figure 3:
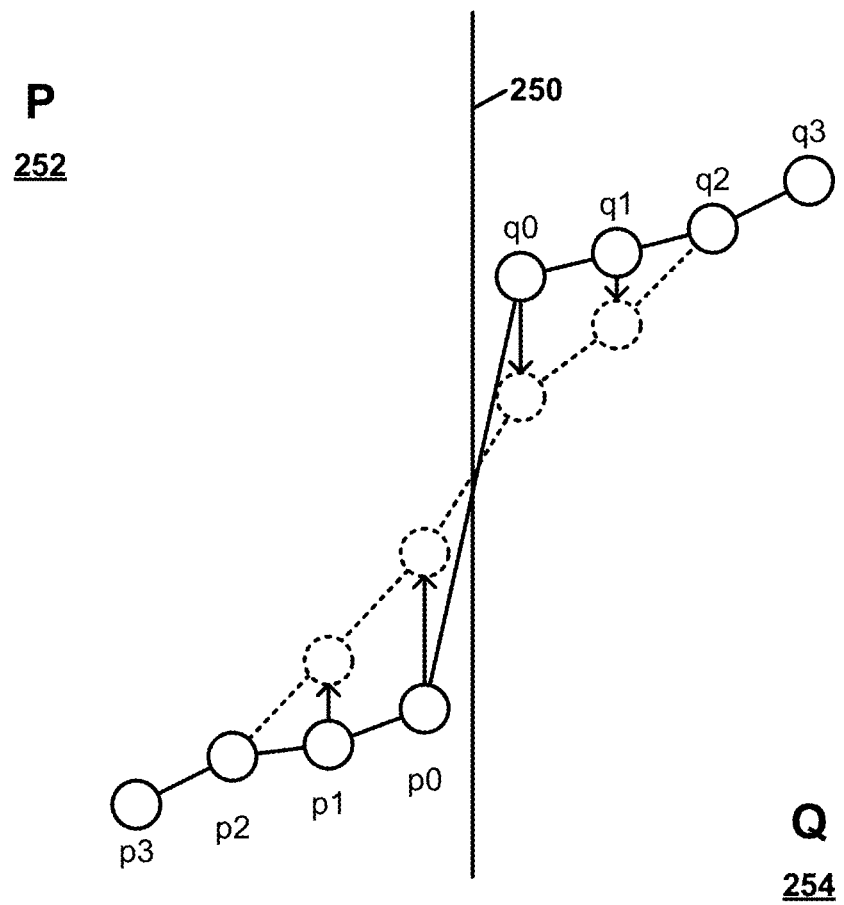
FIG. 3 is a conceptual diagram illustrating an example of a modification of sample values across a boundary due to a deblocking filter.

As shown in the example of FIG. 2, there is a discontinuity in the values of samples p3, p2, p1, p0, q0, q1, q2, and q3 across the boundary 250 between coding blocks 252, 254 due to the non-overlapping nature of coding. Deblocking filtering is applied inside the coding loop to reduce this discontinuity, which improves the subjective or visual quality of the reconstructed picture. Because deblocking filtering occurs inside of the coding loop, deblocking filtering may also improve the temporal prediction because of enhanced reconstruction of the reference frames. In FIG. 3, a visual illustration is shown to describe the filtering process across boundary 250. In other words, FIG. 3 is a conceptual diagram illustrating an example of a modification of sample values across boundary 250 due to a deblocking filter. Specifically, as shown in FIG. 3, the deblocking filter modifies the values of samples p1 and p0 in block P (252) and modifies the values of samples q0 and q1 in block Q (254). Thus, there is less discontinuity between the values of samples on either side of boundary 250.

A video coder (e.g., video encoder 200 or video decoder 300) calculates a boundary strength (Bs) for boundaries that are either coding unit boundaries, prediction unit boundaries, coding subblock boundaries or transform block boundaries, separately for luma and chroma components. In VVC, the boundary strength can take one of the three possible values: 0, 1, and 2. In VVC, the video coder only applies the deblocking filter when the value of Bs is greater or equal to 1 for luma, and Bs=1 for large chroma block boundary (both side P and side Q has greater or equal 8 pixels), and for Bs=2. Thus, a value of Bs=0 indicates deblocking is not applied across that block boundary.

The value of Bs impacts a clipping parameter value (tC), which specifies a maximum modification of a sample value for each filtered sample, compared to the non-deblocked sample. Thus, a greater value of tC indicates the samples could be modified more. tC is proportional to Bs, i.e., blocks with high Bs value will have higher tC value and vice versa.

For each boundary to be deblocked, VVC also allows "one side filtering", which only allows the samples of one side to change, but not the other one (for example, side P is filtered/changed, but not side Q). One side filtering can be beneficial, when, for example, one side of the boundary is using lossless mode, and hence the reconstructed sample values are the same as the original sample values, and hence do not need to be filtered.

There are several coding tools that are part of the VVC standard that are mainly designed for coding of content with sharp edges, where traditional transform coding fails to compact the residual into fewer transform coefficients. In those cases, the transform stage is often skipped. These coding tools are beneficial for screen contents, i.e., content with graphics, animations, synthetic computer-generated content, and so on.

The following describes Transform Skip (TS) Mode. For transform skip mode, the transform stage is skipped when coding the residuals. As a result, residuals are directly quantized in the pixel (residual) domain. See e.g., M. Mrak, J-Z. Xu, "Improved screen content coding in HEVC by Transform Skipping", EUSIPCO, August 2012. In VVC, transform skip mode is only applicable to the luma component. However, there is no theoretical constraint for using transform skip mode on chroma components. The transform skip mode uses a different method for coding quantized residual data, which is different from the residual coding for transform-enabled blocks.

The following describes quantized residual domain block-based delta pulse code modulation (BDPCM). In M. Karczewicz, M. Coban "Quantized residual BDPCM," 14$^{th}$ JVET Meeting, Geneva, C H, March 2019, JVET-N0413 (hereinafter, "JVET-N0413"), quantized residual domain block DPCM is introduced. In BDPCM, intra prediction is performed on the entire block by sample copying in a prediction direction (horizontal or vertical prediction) similar to intra prediction. The residual is quantized and the delta between the quantized residual and its predictor (horizontal or vertical) quantized value is coded. This can be described in the following paragraphs.

For a block of size M (rows)×N (cols), let $r_{i,j}$, $0 \le i \le M-1$, $0 \le j \le N-1$ be the prediction residual after performing intra prediction horizontally (copying left neighbor pixel value across the predicted block line by line) or vertically (copying top neighbor line to each line in the predicted block) using unfiltered samples from above or left block boundary samples. Let $Q(r_{i,j})$, $0 \le i \le M-1$, $0 \le j \le N-1$ denote the quantized version of the residual $r_{i,j}$, where the residual is the difference between original block and the predicted block values. Then, the block DPCM is applied to the quantized residual samples, resulting in modified M×N array R̃ with elements $\tilde{r}_{i,j}$. When vertical BDPCM is signaled:

$$\tilde{r}_{i,j} = \begin{cases} Q(r_{i,j}), & i=0, 0 \le j \le (N-1) \\ Q(r_{i,j}) - Q(r_{(i-1),j}), & 1 \le i \le (M-1), 0 \le j \le (N-1) \end{cases}.$$

For horizontal prediction, similar rules apply, and the residual quantized samples are obtained by:

$$\tilde{r}_{i,j} = \begin{cases} Q(r_{i,j}), & 0 \le i \le (M-1), j=0 \\ Q(r_{i,j}) - Q(r_{i,(j-1)}), & 0 \le i \le (M-1), 1 \le j \le (N-1) \end{cases}.$$

The residual quantized samples $\tilde{r}_{i,j}$ are sent to the decoder (e.g., video decoder 300).

On the decoder side, the above calculations are reversed to produce $Q(r_{i,j})$, $0 \le i \le M-1$, $0 \le j \le N-1$. For vertical prediction case:

$$Q(r_{i,j}) = \Sigma_{k=0}^{i} \tilde{r}_{i,j}, \ 0 \le i \le (M-1), \ 0 \le j \le (N-1).$$

For horizontal case:

$$Q(r_{i,j}) = \sum_{k=0}^{j} \tilde{r}_{i,k}, 0 \le i \le (M-1), 0 \le j \le (N-1)$$

Video decoder 300 adds the inverse quantized residuals, $Q^{-1}(Q(r_{i,j}))$, to the intra block prediction values to produce the reconstructed sample values. BDPCM is inherently a transform skip mode because the transform stages are skipped and the residuals are quantized in the pixel domain. So, for BDPCM mode, transform skip is inferred to be 1. Currently, BDPCM mode is only applicable to the luma component, similar to transform skip mode.

The following section describes palette mode. For palette mode, the pixel values in the CU are represented by a small set of representative color values. The set is referred to as the palette. For pixels with values close to the palette colors, the palette indices are signaled. For pixels with values outside the palette, the pixel is denoted with an escape symbol and the quantized pixel values are signaled directly. To decode a palette encoded block, video decoder 300 needs to decode palette colors and indices. Palette colors are described by a palette table and encoded by palette table coding tools. An escape flag is signaled for each CU to indicate if escape symbols are present in the current CU. If escape symbols are present, the palette table is augmented by one and the last index is assigned to the escape mode. Palette indices of all pixels in a CU form a palette index map and are encoded by palette index map coding tools.

For coding of the palette table, a video coder (e.g., video encoder 200 or video decoder 300) maintains a palette predictor. The video coder initializes the predictor at the beginning of each slice, where the video coder resets the predictor to 0. For each entry in the palette predictor, a reuse flag is signaled to indicate whether the entry is part of the current palette. The reuse flags are sent using run-length coding of zeros. After this, the number of new palette entries are signaled using exponential Golomb codes of order 0. Finally, the component values for the new palette entries are signaled. After coding the current CU, the video coder updates the palette predictor using the current palette, and the video coder adds entries from the previous palette predictor which are not reused in the current palette at the end of a new palette predictor until the maximum size allowed is reached (which is referred to as palette stuffing).

Figure 4A:
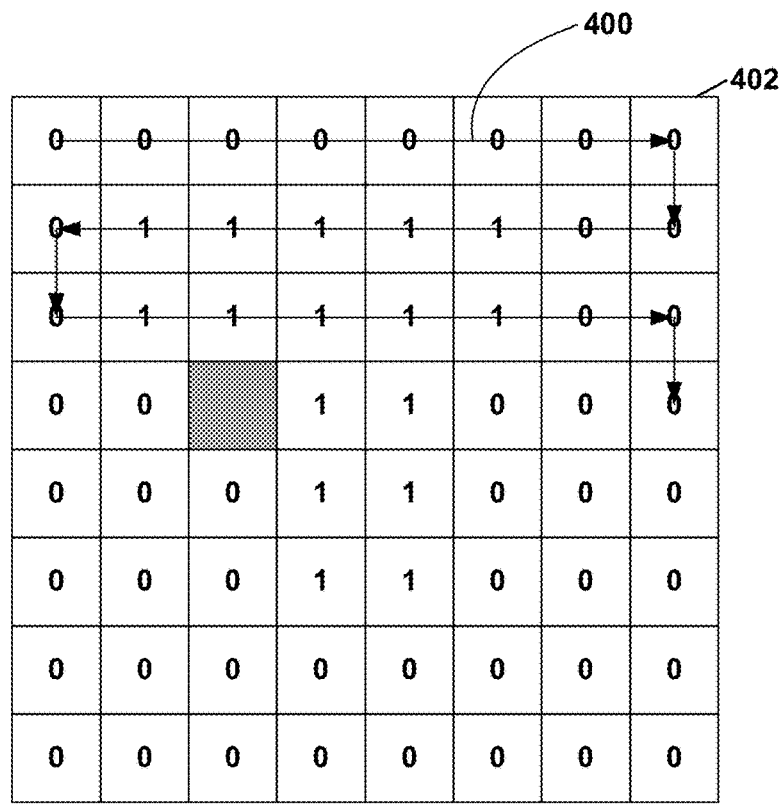
FIG. 4A is a conceptual diagram illustrating an example horizontal traverse scan for Palette Mode.
Figure 4B:
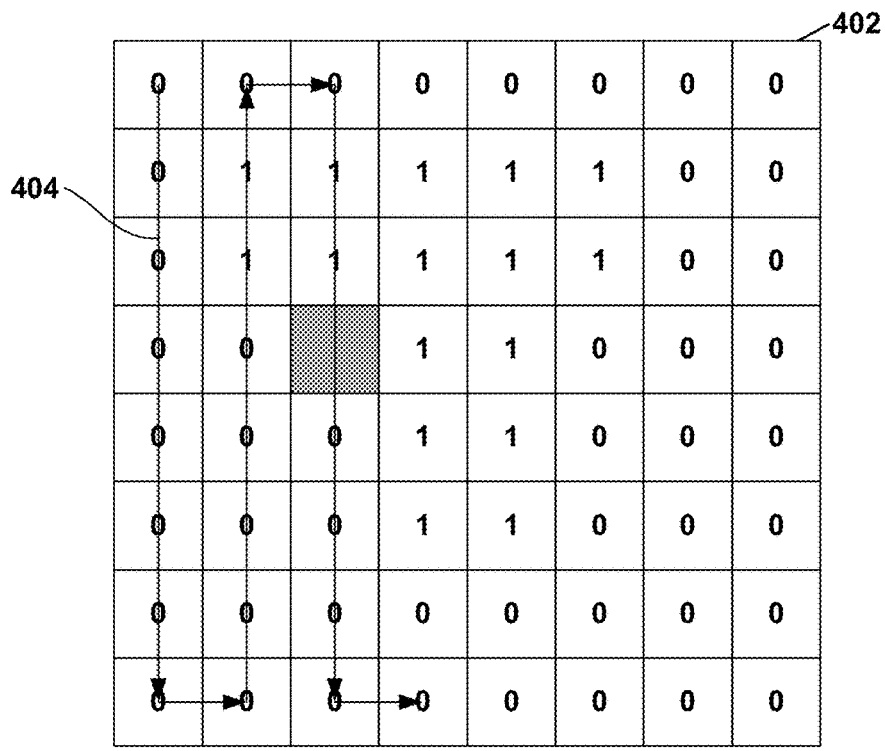
FIG. 4B is a conceptual diagram illustrating an example vertical traverse scan for Palette Mode.

For coding the palette index map, the video coder codes the indices using horizontal and vertical traverse scans as shown in FIG. 4A and FIG. 4B. FIG. 4A is a conceptual diagram illustrating an example horizontal traverse scan 400 in a block 402. FIG. 4B is a conceptual diagram illustrating an example vertical traverse scan 404 in block 402. The scan order is explicitly signaled in the bitstream using the palette_transpose_flag. Values shown in FIG. 4A and FIG. 4B indicate palette index values for samples of block 402. In FIG. 4A and FIG. 4B, the shaded blocks indicate escape mode coded samples (i.e., samples having values that are not included in the palette).

The following describes Lossless Mode. VVC Draft 6 implements a type of lossless model known as transquantbypass mode. In VVC Draft 6, the transquantbypass mode is enabled from a picture parameter set. In other words, a picture parameter set may include a flag indicating whether the transquantbypass mode is enabled in pictures referring to the picture parameter set. For each CU, a transquantbypass flag is signaled. The value of the transquantbypass flag '1' indicates that the CU bypasses or skips transform and quantization steps. In other words, residual data are directly entropy coded. Due to the exact coding of the residual data, the corresponding reconstructed CU is exactly the same as the original one. In other words, the CU is lossless coded. Lossless mode is useful for local coding of graphic content where quantization artifacts may be hardly or not at all tolerable. Video encoder 200 may also switch to this mode if the bit cost for transform coding at a very low QP would exceed the cost of bypass coding.

It can be observed that all these four modes (transform skip mode, quantized residual domain BDPCM, palette mode, and lossless mode) skip the transform stages and can be helpful for coding objects with sharp edges. The loop filtering, and particularly deblock filtering, may be avoided because loop filtering may smooth the edges, which might have a negative impact for graphic content such as screen content.

Though these four different coding modes (transform skip mode, quantized residual domain BDPCM, palette mode, and lossless mode) employ transform skip, the coding modes are treated differently for deblocking operations, and particularly for boundary strength determination.

For instance, for BDPCM, if both side P and side Q are BDPCM, then the boundary strength is equal to zero and deblocking is off. Else, for BDPCM, if only one side is BDPCM, the boundary strength is equal to two. For transform skip mode, if at least one side is transform skip, the boundary strength is equal to 1. For palette mode, the palette-coded side of the boundary is not filtered at the deblocking stage. For lossless mode, the lossless side is not filtered at the deblocking stage.

One aim of the techniques of this disclosure is to treat BDPCM, transform skip mode, palette mode, and lossless mode in the same manner. In other words, the deblocking operations/conditions are harmonized for these modes. The different examples of this disclosure can be applied separately or in a combined way.

In accordance with a first example of this disclosure, Boolean variables isPsideTheseModes and isQsideTheseModes are defined in the following way:
  isPsideTheseModes is true if a mode of Pside is either BDPCM OR transform skip OR Palette OR lossless, otherwise false.
  isQsideTheseModes is true if a mode of Qside is either BDPCM OR transform skip OR Palette OR lossless, otherwise false.

Pside denotes a block P and Qside denotes a block Q, where P and Q are blocks on opposite sides of a boundary, such as boundary 250 (FIG. 2, FIG. 3). The boundary may be vertical or horizontal (or, in some instances, diagonal).

Items a, b, and c below are example ways to harmonize the deblocking conditions for BDPCM, transform skip mode, palette mode, and/or lossless mode, given the definitions of isPsideTheseModes and isQsideTheseModes presented above.
  a. If either isPsideTheseModes OR isQsideTheseModes are true, boundary strength is equal to zero, i.e., no deblocking is applied on that boundary.
  b. If isPsideTheseModes AND isQsideTheseModes are true, boundary strength is equal to zero, i.e., no deblocking is applied on that boundary.
  c. Deblocking filter is not applied to Pside if isPsideTheseModes is true, and Deblocking filter is not applied to Qside if isQsideTheseModes is true.

The harmonization can be performed separately for luma and chroma components. In the current VVC standard, BDPCM mode and transform skip mode are only applicable to the luma component. Lossless mode is applicable to luma and chroma components. Palette mode is applicable to luma and chroma components when dual tree is disabled, and only to luma component when dual tree is enabled. Thus, for different components (luma and chroma), the harmonization is applied between different modes when they are applicable for that particular component. Thus, a video coder (e.g., video encoder 200 or video decoder 300) may determine whether a coding mode of a chroma component of the first block is in the set of applicable coding modes, determine whether a coding mode of the chroma component of the second block is in the set of applicable coding modes, and determine that a deblocking filter is disabled for at least one of the chroma component of the first block and the chroma component of the second block based on at least one of: the coding mode of the chroma component of the first block being in the set of applicable coding modes and the coding mode of the chroma component of the second block being in the set of applicable coding modes.

In a second example of this disclosure, only a subset of modes from {transform skip, BDPCM mode, palette mode, lossless mode} are harmonized. For example, isPsideTheseModes and isQsideTheseModes may be defined by removing lossless case for harmonization, in the following way:

isPsideTheseModes is true if a mode of Pside is either BDPCM mode OR transform skip mode OR palette mode, otherwise false.

isQsideTheseModes is true if a mode of Qside is either BDPCM mode OR transform skip mode OR palette mode, otherwise false.

The three ways of harmonization denoted by items a, b, and c defined in the first example, above, may be applied in the second example.

In a third example of this disclosure, one of these modes (e.g., transform skip mode, BDPCM mode, palette mode, and lossless mode) can be modified with additional conditions for the harmonization. For example, for transform skip, only intra coded transform skip may be chosen to harmonize. Thus, in this example, the inter coded transform skip is not harmonized in this case. Accordingly, isPsideTheseModes and isQSideTheseModes can be defined in the following way:

isPsideTheseModes is true if a mode of Pside is either BDPCM mode OR intra coded transform skip mode OR palette mode OR lossless mode, otherwise false.

isQsideTheseModes is true if a mode of Qside is either BDPCM mode OR intra coded transform skip mode OR palette mode OR lossless mode, otherwise false.

In a fourth example of this disclosure, one or more modes may be chosen to add in the harmonization, which may not necessarily use transform skip. For example, the intra block copy (IBC) tool may be chosen for harmonization. In this example, isPsideTheseModes and isQsideTheseModes may be defined as follows:

isPsideTheseModes is true if a mode of Pside is either BDPCM mode OR transform skip mode OR palette mode OR lossless mode OR intra block copy mode, otherwise false.

isQsideTheseModes is true if a mode of Qside is either BDPCM mode OR transform skip mode OR palette mode OR lossless mode OR intra block copy mode, otherwise false.

In a fifth example of this disclosure, SPS, PPS, or slice level flags can be used to enable/disable this harmonized deblocking condition. The harmonized deblocking condition can be disabled when this harmonization harms coding efficiency. SPS, PPS, and/or slice level flags can be signaled for modifying the harmonization set as discussed in the second, third, and fourth examples described above.

In a sixth example of this disclosure, this harmonization can be enabled/disabled based on a Quantization Parameter (QP) of the Slice, PPS or SPS. For example, if a QP of a slice, PPS, or SPS is above (or below) a threshold, a video coder may enforce items a, b, or c as described above; otherwise, if the QP of the slice, PPS, or SPS is below (or above) the threshold, the video coder does not enforce items a, b, or c and may, for instance, determine whether to apply deblocking in the manner previously provided in VVC. Regarding sixth example, in general, deblocking is not applied or maybe weakly applied at lower QP. A reason for this is that at low QP, the overall distortion of the reconstructed picture/coding block is reduced as all the details is (almost) preserved due to very small quantization step size. Moreover, as different picture/slices may use different QPs, so it may result different level of distortion across different slices/pictures. Accordingly, deblocking operation may need adaptation.

In a seventh example of this disclosure, this harmonization can be enabled/disabled based on the Slice Type, i.e., I, P or B. For example, if a slice type of a slice is in a specific set of slice types, a video coder may enforce items a, b, or c as described above with respect to blocks in the slice; otherwise, if the slice type of the slice is not in the specific set of slice types, the video coder does not enforce items a, b, or c with respect to blocks in the slice and may, for instance, determine whether to apply deblocking to blocks in the slice in the manner previously provided in VVC. Regarding seventh example, it is seen that typically B slices produce the least amount of residual (due to the efficient bidirectional inter prediction), followed by P slices and I slices. Due to this difference in residual energy, the impact of quantization may be least in B slices and thus it may need weaker deblocking and vice versa.

In an eighth example of this disclosure, this harmonization can be enabled/disabled based on the block size of Pside and Qside. For example, if a block size of Pside or Qside is above (or below) a threshold, a video coder may enforce items a, b, or c as described above with respect to Pside or Qside; otherwise, if the block size of Pside or Qside is below (or above) the threshold, the video coder does not enforce items a, b, or c with respect to Pside or Qside and may, for instance, determine whether to apply deblocking to Pside or Qside in the manner previously provided in VVC. With respect to the eighth example, larger coding blocks are typically used for smooth regions, while detailed regions may use smaller blocks. So, depending on the smoothness or detail of the block, deblocking may need adaptation.

Thus, a video coder (e.g., video encoder 200 or video decoder 300) may determine whether a coding mode of a first block of the video data is in a set of applicable coding modes, wherein the set of applicable coding modes includes at least one of a BDPCM mode, a transform skip mode, a palette mode, or a lossless mode. Additionally, the video coder may determine whether a coding mode of a second block of the video data is in the set of applicable coding modes, wherein the second block is adjacent to the first block. The video coder may determine that a deblocking filter is disabled for a color component of at least one of the first block or the second block based on at least one of: the coding mode of the first block being in the set of applicable coding modes or the coding mode of the second block being in the set of applicable coding modes. For instance, in some examples, the video coder may determine that the deblocking filter is disabled for the color component of the first block and the second block based on either the coding mode of the first block or the coding mode of the second block being in the set of applicable coding modes. In some examples, the video coder may determine that the deblocking filter is disabled for the color component of the first block and the second block based on both the coding mode of the first block and the coding mode of the second block being in the set of applicable coding modes. In some examples, the video coder may determine that the deblocking filter is disabled for the color component of the first block based on the coding mode of the first block being in the set of applicable coding modes and may determine that the deblocking filter is disabled for the second block based on the coding mode of the second block being in the set of applicable coding modes. Furthermore, consistent with the third example, the set of applicable coding modes may include an intra coded transform skip mode and not an inter coded transform skip mode. Consistent with the fourth example, the set of applicable coding modes may include one or more coding modes that do not use transform skip. Consistent with the sixth, seventh, and eighth examples, the video coder may determine whether to disable a step of determining that the deblocking filter is disabled for the color component of at least one of the first block or the second block based on one or more of: a syntax element in a sequence parameter set, a picture parameter set, or a slice; a quantization parameter of the slice, the picture parameter set, or the sequence parameter set; a slice type, or a block size of the first block or the second block.

In some examples, the color component is a luma component, the coding mode of the first block is a coding mode for the luma component of the first block, the coding mode of the second block is a coding mode for the luma component of the second block, and the video coder is further configured to determine whether a coding mode of a chroma component of the first block is in the set of applicable coding modes; determine whether a coding mode of the chroma component of the second block is in the set of applicable coding modes; and determine that a deblocking filter is disabled for at least one of the chroma component of the first block and the chroma component of the second block based on at least one of: the coding mode of the chroma component of the first block being in the set of applicable coding modes and the coding mode of the chroma component of the second block being in the set of applicable coding modes.

Figure 5:
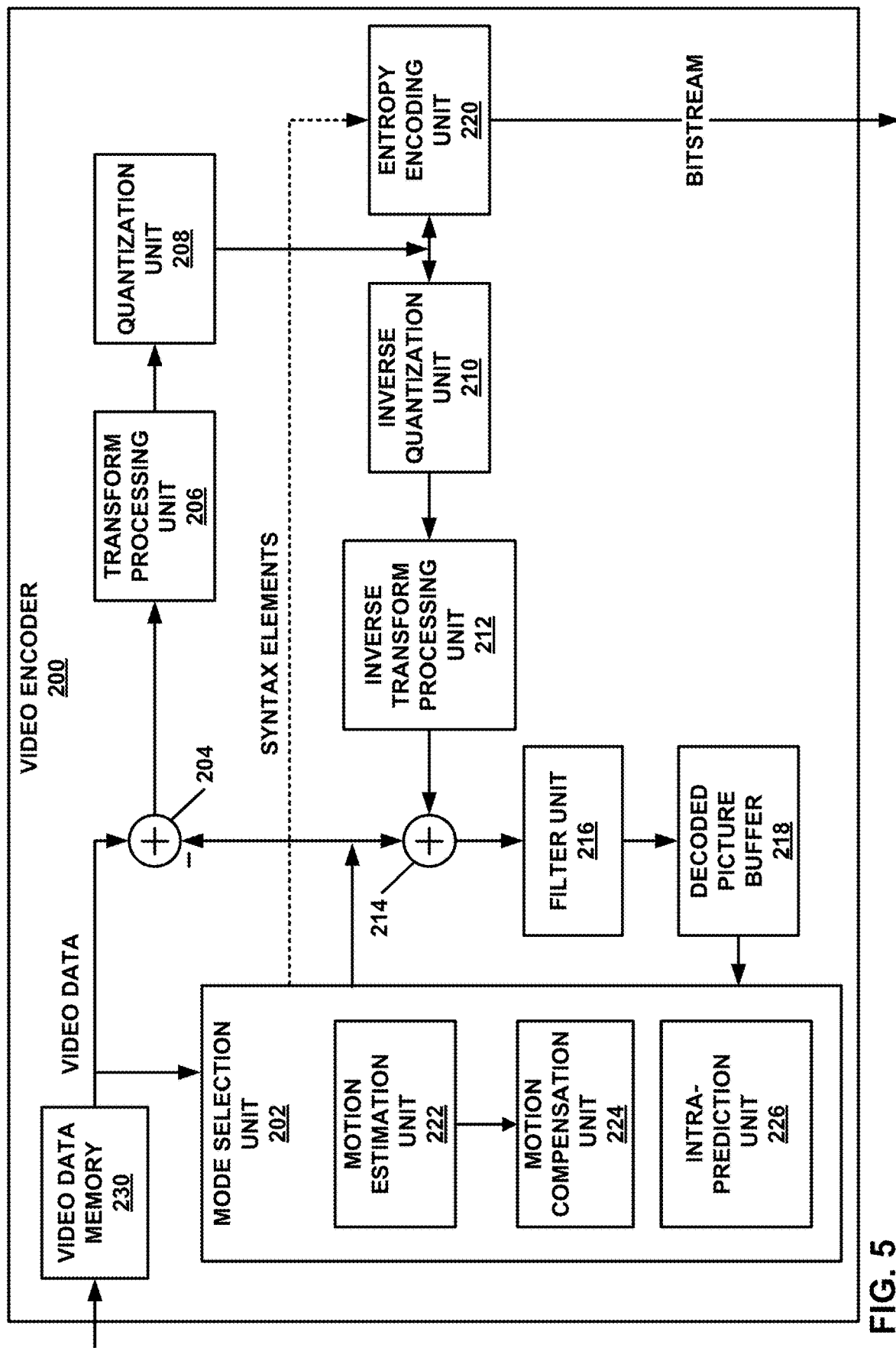
FIG. 5 is a block diagram illustrating an example video encoder that may perform the techniques of this disclosure.

FIG. 5 is a block diagram illustrating an example video encoder 200 that may perform the techniques of this disclosure. FIG. 5 is provided for purposes of explanation and should not be considered limiting of the techniques as broadly exemplified and described in this disclosure. For purposes of explanation, this disclosure describes video encoder 200 in the context of video coding standards such as the HEVC video coding standard and the H.266 video coding standard in development. However, the techniques of this disclosure are not limited to these video coding standards and are applicable generally to video encoding and decoding.

In the example of FIG. 5, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. Moreover, video encoder 200 may include additional or alternative processors or processing circuitry to perform these and other functions.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 5 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the instructions (e.g., object code) of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs and may encapsulate one or more CTUs within a slice. Mode selection unit 202 may partition a CTU of the picture in accordance with a tree structure, such as a QTBT structure or a quad-tree structure. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

Mode selection unit 202 provides the prediction block to residual generation unit 204. Residual generation unit 204 receives a raw, unencoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit 202 does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as a few examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be entropy encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the transform coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

In accordance with one or more techniques of this disclosure, filter unit 216 (or a unit within filter unit 216) may determine whether a coding mode of a first block of the video data is in a set of applicable coding modes. The set of applicable coding modes may include at least one of a BDPCM mode, a transform skip mode, a palette mode, or a lossless mode. Additionally, filter unit 216 (or a unit within filter unit 216) may determine whether a coding mode of a second block of the video data is in the set of applicable coding modes. The second block is adjacent to the first block. Filter unit 216 (or a unit within filter unit 216) may determine that a deblocking filter is disabled for a color component of at least one of the first block or the second block based on at least one of: the coding mode of the first block being in the set of applicable coding modes or the coding mode of the second block being in the set of applicable coding modes.

Video encoder 200 stores reconstructed blocks in DPB 218. For instance, in examples where operations of filter unit 216 are not needed, reconstruction unit 214 may store reconstructed blocks to DPB 218. In examples where operations of filter unit 216 are needed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying an MV and reference picture for the chroma blocks. Rather, the MV for the luma coding block may be scaled to determine the MV for the chroma blocks, and the reference picture may be the same. As another example, the intra-prediction process may be the same for the luma coding block and the chroma coding blocks.

Video encoder 200 represents an example of a device configured to encode video data including a memory configured to store video data, and one or more processing units implemented in circuitry and configured to determine whether a coding mode of a first block of the video data is in a set of applicable coding modes. The set of applicable coding modes may include at least one of a BDPCM mode, a transform skip mode, a palette mode, or a lossless mode. Additionally, the one or more processing units of video encoder 200 may determine whether a coding mode of a second block of the video data is in the set of applicable coding modes. The second block is adjacent to the first block. The one or more processing units of video encoder 200 may determine that a deblocking filter is disabled for a color component of at least one of the first block or the second block based on at least one of: the coding mode of the first block being in the set of applicable coding modes or the coding mode of the second block being in the set of applicable coding modes.

Figure 6:
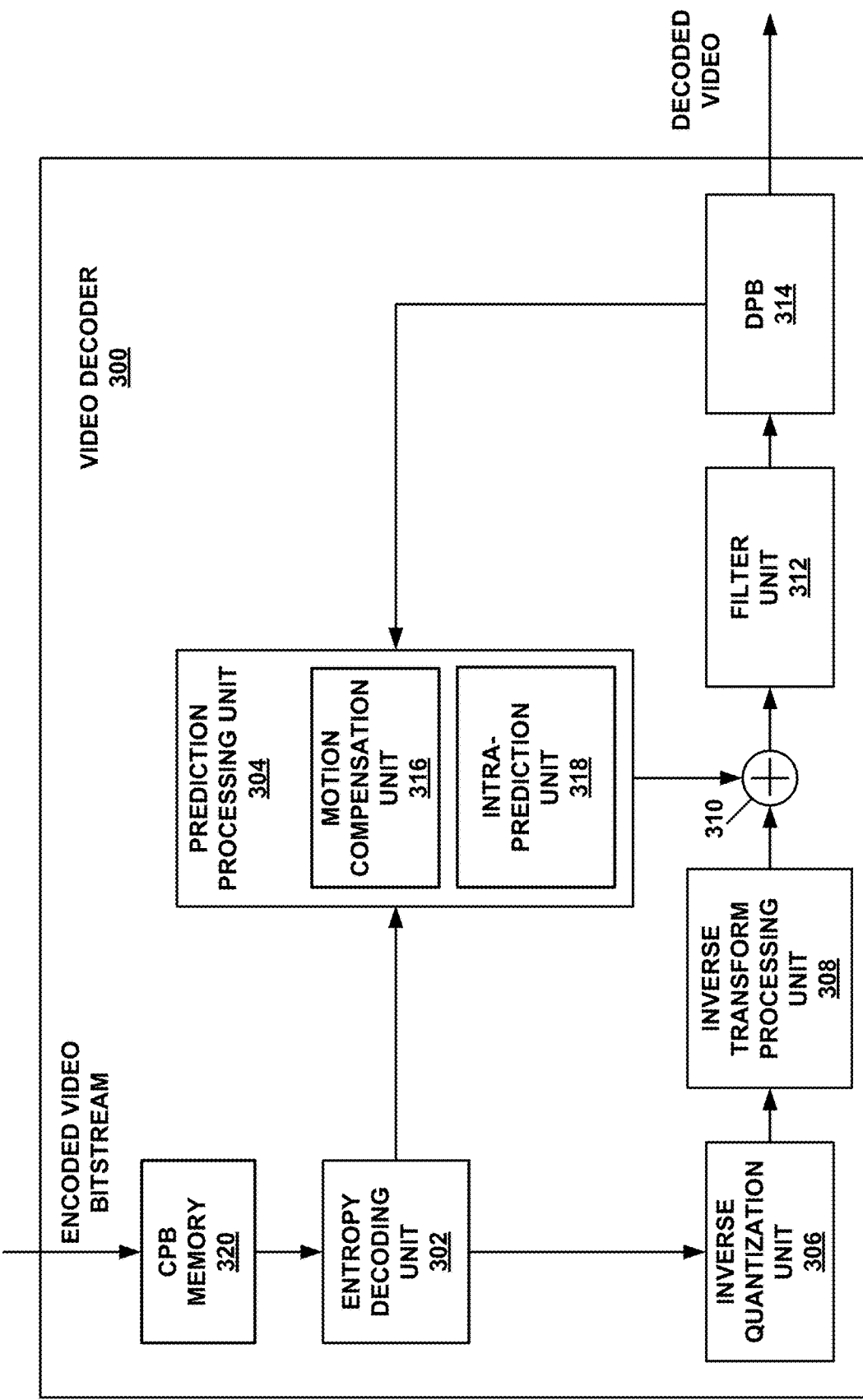
FIG. 6 is a block diagram illustrating an example video decoder that may perform the techniques of this disclosure.

FIG. 6 is a block diagram illustrating an example video decoder 300 that may perform the techniques of this disclosure. FIG. 6 is provided for purposes of explanation and is not limiting on the techniques as broadly exemplified and described in this disclosure. For purposes of explanation, this disclosure describes video decoder 300 according to the techniques of VVC, and HEVC. However, the techniques of this disclosure may be performed by video coding devices that are configured to other video coding standards.

In the example of FIG. 6, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. Moreover, video decoder 300 may include additional or alternative processors or processing circuitry to perform these and other functions.

Prediction processing unit 304 includes motion compensation unit 316 and intra-prediction unit 318. Prediction processing unit 304 may include additional units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as DRAM, including SDRAM, MRAM, RRAM, or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to be executed by processing circuitry of video decoder 300.

The various units shown in FIG. 6 are illustrated to assist with understanding the operations performed by video decoder 300. The units may be implemented as fixed-function circuits, programmable circuits, or a combination thereof. Similar to FIG. 5, fixed-function circuits refer to circuits that provide particular functionality and are preset on the operations that can be performed. Programmable circuits refer to circuits that can be programmed to perform various tasks and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the transform coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 5).

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 5). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

In accordance with one or more techniques of this disclosure, filter unit 312 (or a unit within filter unit 312) may determine whether a coding mode of a first block of the video data is in a set of applicable coding modes. The set of applicable coding modes may include at least one of a BDPCM mode, a transform skip mode, a palette mode, or a lossless mode. Additionally, filter unit 312 (or a unit within filter unit 312) may determine whether a coding mode of a second block of the video data is in the set of applicable coding modes. The second block is adjacent to the first block. Filter unit 312 (or a unit within filter unit 312) may determine that a deblocking filter is disabled for a color component of at least one of the first block or the second block based on at least one of: the coding mode of the first block being in the set of applicable coding modes or the coding mode of the second block being in the set of applicable coding modes.

Video decoder 300 may store the reconstructed blocks in DPB 314. For instance, in examples where operations of filter unit 312 are not performed, reconstruction unit 310 may store reconstructed blocks to DPB 314. In examples where operations of filter unit 312 are performed, filter unit 312 may store the filtered reconstructed blocks to DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures (e.g., decoded video) from DPB 314 for subsequent presentation on a display device, such as display device 118 of FIG. 1.

In this manner, video decoder 300 represents an example of a video decoding device including a memory configured to store video data, and one or more processing units implemented in circuitry and configured to determine whether a coding mode of a first block of the video data is in a set of applicable coding modes. The set of applicable coding modes may include at least one of a BDPCM mode, a transform skip mode, a palette mode, or a lossless mode. Additionally, the one or more processing units of video decoder 300 may determine whether a coding mode of a second block of the video data is in the set of applicable coding modes. The second block is adjacent to the first block. The one or more processing units of video decoder 300 may determine that a deblocking filter is disabled for a color component of at least one of the first block or the second block based on at least one of: the coding mode of the first block being in the set of applicable coding modes or the coding mode of the second block being in the set of applicable coding modes.

Figure 7:
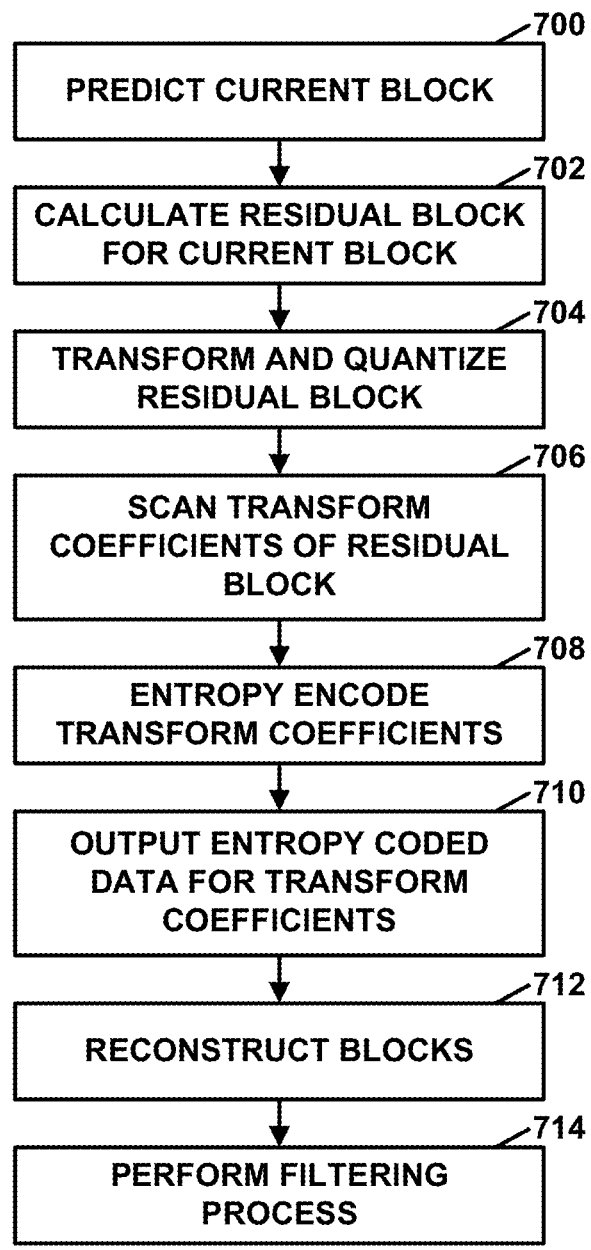
FIG. 7 is a flowchart illustrating an example method for encoding a current block of a current picture, in accordance with one or more techniques of this disclosure.

FIG. 7 is a flowchart illustrating an example method for encoding a current block of a current picture. The current block may comprise a current CU. Although described with respect to video encoder 200 (FIGS. 1 and 5), other devices may be configured to perform a method similar to that of FIG. 7.

In this example, video encoder 200 initially predicts the current block (700). For example, video encoder 200 may form a prediction block for the current block. Video encoder 200 may then calculate a residual block for the current block (702). To calculate the residual block, video encoder 200 may calculate a difference between the original, unencoded block and the prediction block for the current block. Video encoder 200 may then transform and quantize transform coefficients of the residual block (704). Next, video encoder 200 may scan the quantized transform coefficients of the residual block (706). During the scan, or following the scan, video encoder 200 may entropy encode the transform coefficients (708). For example, video encoder 200 may encode the transform coefficients using CAVLC or CABAC. Video encoder 200 may then output the entropy encoded data of the block (710).

Furthermore, in the example of FIG. 7, video encoder 200 may reconstruct blocks of the current picture (712). For instance, video encoder 200 (e.g., reconstruction unit 214 of video encoder 200) may combine predicted blocks with reconstructed residual data of blocks to reconstruct the blocks of the current picture. In addition, video encoder 200 (e.g., filter unit 216 of video encoder 200) may perform a filtering process on blocks of the current picture (714). The filtering process may apply one or more filters, such as a deblocking filter. In accordance with one or more techniques of this disclosure, video encoder 200 (e.g., filter unit 216) may determine whether a coding mode of a first block of the video data is in a set of applicable coding modes, wherein the set of applicable coding modes includes at least one of a BDPCM mode, a transform skip mode, a palette mode, or a lossless mode; determine whether a coding mode of a second block of the video data is in the set of applicable coding modes, wherein the second block is adjacent to the first block; and determine that a deblocking filter is disabled for a color component of at least one of the first block or the second block based on at least one of: the coding mode of the first block being in the set of applicable coding modes or the coding mode of the second block being in the set of applicable coding modes. Video encoder 200 may apply the deblocking filter when the deblocking filter is not disabled.

Figure 8:
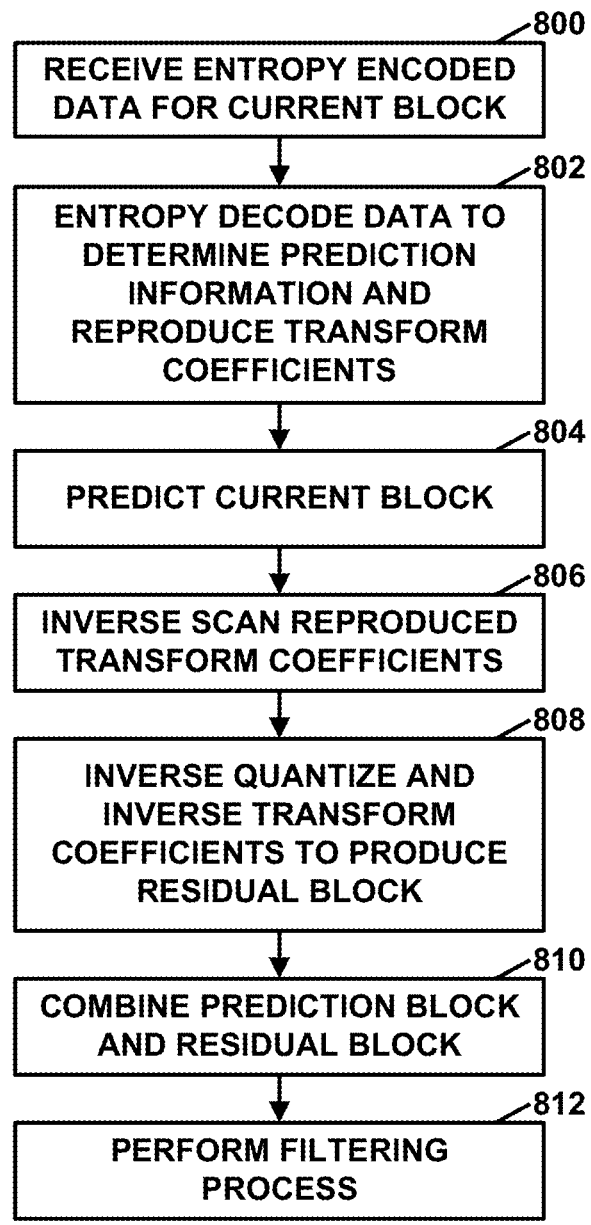
FIG. 8 is a flowchart illustrating an example method for decoding a current block of a current picture, in accordance with one or more techniques of this disclosure.

FIG. 8 is a flowchart illustrating an example method for decoding a current block of video data. The current block may comprise a current CU. Although described with respect to video decoder 300 (FIGS. 1 and 6), it should be understood that other devices may be configured to perform a method similar to that of FIG. 8.

Video decoder 300 may receive entropy encoded data for the current block, such as entropy encoded prediction information and entropy encoded data for transform coefficients of a residual block corresponding to the current block (800). Video decoder 300 may entropy decode the entropy encoded data to determine prediction information for the current block and to reproduce transform coefficients of the residual block (802). Video decoder 300 may predict the current block (804), e.g., using an intra- or inter-prediction mode as indicated by the prediction information for the current block, to calculate a prediction block for the current block. Video decoder 300 may then inverse scan the reproduced transform coefficients (806), to create a block of quantized transform coefficients. Video decoder 300 may then inverse quantize and inverse transform the transform coefficients to produce a residual block (808). Video decoder 300 may ultimately decode the current block by combining the prediction block and the residual block (810).

Additionally, in the example of FIG. 8, video decoder 300 (e.g., filter unit 312 or a unit within filter unit 312) may apply a filtering process to one or more blocks of the current picture (812). According to the filtering process, video decoder 300 may apply one or more filters, such as a deblocking filter, to the blocks. In accordance with one or more techniques of this disclosure, video decoder 300 (e.g., filter unit 312) may determine whether a coding mode of a first block of the video data is in a set of applicable coding modes, wherein the set of applicable coding modes includes at least one of a BDPCM mode, a transform skip mode, a palette mode, or a lossless mode; determine whether a coding mode of a second block of the video data is in the set of applicable coding modes, wherein the second block is adjacent to the first block; and determine that a deblocking filter is disabled for a color component of at least one of the first block or the second block based on at least one of: the coding mode of the first block being in the set of applicable coding modes or the coding mode of the second block being in the set of applicable coding modes. Video decoder 300 may apply the deblocking filter when the deblocking filter is not disabled.

Figure 9:
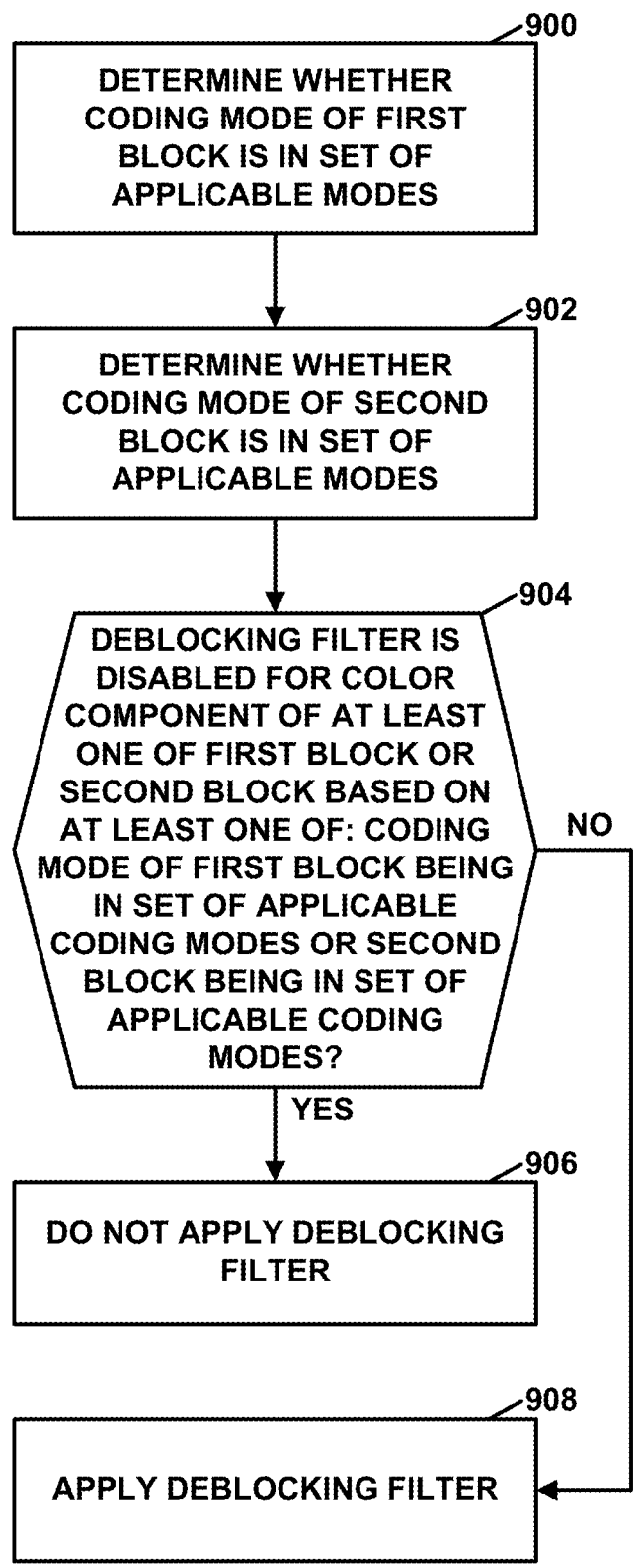
FIG. 9 is a flowchart illustrating an example method for coding video data, in accordance with one or more techniques of this disclosure.

FIG. 9 is a flowchart illustrating an example method for coding video data, in accordance with one or more techniques of this disclosure. In some examples, a video coder (e.g., video encoder 200 or video decoder 300) may perform the method of FIG. 9 as part of performing a filtering process in steps 714 of FIG. 7 or 812 of FIG. 8.

In the example of FIG. 9, the video coder may determine whether a coding mode of a first block of the video data is in a set of applicable coding modes (900). The set of applicable coding modes includes at least one of a BDPCM mode, a transform skip mode, a palette mode, or a lossless mode. In some examples, the set of applicable coding modes includes an intra coded transform skip mode and not an inter coded transform skip mode. In some examples, the set of applicable coding modes includes one or more coding modes that do not use transform skip (e.g., an intra block copy mode). Furthermore, in the example of FIG. 9, the video coder may determine whether a coding mode of a second block of the video data is in the set of applicable coding modes, wherein the second block is adjacent to the first block (902).

The video coder may determine whether a deblocking filter is disabled for a color component of at least one of the first block or the second block based on at least one of: the coding mode of the first block being in the set of applicable coding modes or the coding mode of the second block being in the set of applicable coding modes (904). In some examples, the video coder may determine that the deblocking filter is disabled for the color component of the first block and the second block based on either the coding mode of the first block or the coding mode of the second block being in the set of applicable coding modes (e.g., when either isPsideTheseModes OR isQsideTheseModes are true, boundary strength is equal to zero, i.e., no deblocking is applied on that boundary). In some examples, the video coder may determine that the deblocking filter is disabled for the color component of the first block and the second block based on both the coding mode of the first block and the coding mode of the second block being in the set of applicable coding modes (e.g., when isPsideTheseModes AND isQsideTheseModes are true, boundary strength is equal to zero, i.e., no deblocking is applied on that boundary). In some examples, the video coder may determine that the deblocking filter is disabled for the color component of the first block based on the coding mode of the first block being in the set of applicable coding mode and may determine that the deblocking filter is disabled for the second block based on the coding mode of the second block being in the set of applicable coding modes (e.g., Deblocking filter is not applied Pside, if isPsideTheseModes is true, and Deblocking filter is not applied Qside, if isQsideTheseModes is true).

In some examples, the color component is a luma component, the coding mode of the first block is a coding mode for the luma component of the first block, and the coding mode of the second block is a coding mode for the luma component of the second block. In such examples, the video coder may determine whether a coding mode of a chroma component of the first block is in the set of applicable coding modes. Additionally, the video coder may determine whether a coding mode of the chroma component of the second block is in the set of applicable coding modes. In such examples, the video coder may determine that a deblocking filter is disabled for at least one of the chroma component of the first block and the chroma component of the second block based on at least one of: the coding mode of the chroma component of the first block being in the set of applicable coding modes and the coding mode of the chroma component of the second block being in the set of applicable coding modes.

In some examples, the video coder may determine whether to disable a step of determining that the deblocking filter is disabled for the color component of at least one of the first block or the second block based on one or more of: a syntax element in a sequence parameter set, a picture parameter set, or a slice, a quantization parameter of the slice, the picture parameter set, or the sequence parameter set, a slice type, or a block size of the first block or the second block. For instance, the video coder may skip step 904 based on such a syntax element of quantization parameter.

When the video coder determines that the deblocking filter is disabled for a color component of at least one of the first block or the second block based on at least one of: the coding mode of the first block being in the set of applicable coding modes or the coding mode of the second block being in the set of applicable coding modes ("YES" branch of 904), the video coder does not apply the deblocking filter to the color component at least one of the first block or the second block (906). Alternatively, the video coder may determine that the deblocking filter is not disabled for a color component of at least one of the first block or the second block, e.g., because the coding mode of the first block is not in the set of applicable coding modes and the coding mode of the second block is not in the set of applicable coding modes ("NO" branch of 904), the video coder may apply the deblocking filter to the color component of one or more of the first block and the second block (908). In some examples, the video coder does not apply the deblocking filter even if the deblocking filter is not disabled (e.g., because the video coder may determine a boundary strength of 0 based on sample values).

Video encoder 200 may perform the method of FIG. 9 as part of encoding video data. For instance, video encoder 200 may include an encoded representation of the first block and an encoded representation of the second block in a bitstream that includes an encoded representation of the video data. Video decoder 300 may perform the method of FIG. 9 as part of decoding video data. In such examples, video decoder 300 may obtain a bitstream that includes an encoded representation of the first block and an encoded representation of the second block. Video decoder 300 may reconstruct the first block and the second block based on the encoded representation of the first block and the encoded representation of the second block.

The following is a non-limiting list of examples that are in accordance with one or more techniques of this disclosure.

Example 1. A method of coding video data, the method comprising: determining whether a coding mode of a first block of the video data is in a set of applicable coding modes, wherein the set of applicable coding modes includes at least one of a block-based delta pulse code modulation (BDPCM) mode, a transform skip mode, a palette mode, or a lossless mode; determining whether a coding mode of a second block of the video data is in the set of applicable coding modes, wherein the second block is adjacent to the first block; and determining that a deblocking filter is disabled for a color component of at least one of the first block and the second block based on at least one of: the coding mode of the first block is in the set of applicable coding modes and the coding mode of the second block is in the set of applicable coding modes.

Example 2. The method of example 1, wherein determining that the deblocking filter is disabled for the color component of at least one of the first block and the second block comprises: determining that the deblocking filter is disabled for the color component of the first block and the second block based on either the coding mode of the first block or the coding mode of the second block being in the set of applicable coding modes.

Example 3. The method of example 1, wherein determining that a deblocking filter is disabled for the color component of at least one of the first block and the second block comprises: determining that the deblocking filter is disabled for the color component of the first block and the second block based on both the coding mode of the first block and the coding mode of the second block being in the set of applicable coding modes.

Example 4. The method of example 1, wherein determining that a deblocking filter is disabled for the color component of at least one of the first block and the second block comprises: determining that the deblocking filter is disabled for the color component of the first block based on the coding mode of the first block being in the set of applicable coding mode and determining that the deblocking filter is disabled for the second block based on the coding mode of the second block being in the set of applicable coding modes.

Example 5. The method of any of examples 1-4, wherein: the color component is a luma component, the coding mode of the first block is a coding mode for the luma component of the first block, the coding mode of the second block is a coding mode for the luma component of the second block, the method further comprises: determining whether a coding mode of a chroma component of the first block is in the set of applicable coding modes; determining whether a coding mode of the chroma component of the second block is in the set of applicable coding modes; and determining that a deblocking filter is disabled for at least one of the chroma component of the first block and the chroma component of the second block based on at least one of: the coding mode of the chroma component of the first block is in the set of applicable coding modes and the coding mode of the chroma component of the second block is in the set of applicable coding modes.

Example 6. The method of any of examples 1-5, wherein the set of applicable coding modes includes an intra coded transform skip mode and not an inter coded transform skip mode.

Example 7. The method of any of examples 1-5, wherein the set of applicable coding modes includes one or more coding modes that do not use transform skip.

Example 8. The method of example 7, wherein the one or more coding modes that do not use transform skip include an intra block copy mode.

Example 9. The method of any of examples 1-8, further comprising determining whether to disable a step of determining that the deblocking filter is disabled for the color component of at least one of the first block and the second block based on one or more of: a syntax element in a sequence parameter set, a picture parameter set, or a slice, a quantization parameter of the slice, the picture parameter set, or the sequence parameter set, a slice type, or a block size of the first block or the second block.

Example 10. The method of any of examples 1-9, wherein coding comprises decoding.

Example 11. The method of any of examples 1-9, wherein coding comprises encoding.

Example 12. A device for coding video data, the device comprising one or more means for performing the method of any of examples 1-11.

Example 13. The device of example 12, wherein the one or more means comprise one or more processors implemented in circuitry.

Example 14. The device of example 13, wherein the circuitry comprises an integrated circuit.

Example 15. The device of any of examples 12 and 14, further comprising a memory to store the video data.

Example 16. The device of any of examples 12-15, further comprising a display configured to display decoded video data.

Example 17. The device of any of examples 12-16, wherein the device comprises one or more of a camera, a computer, a mobile device, a broadcast receiver device, or a set-top box.

Example 18. The device of any of examples 12-17, wherein the device comprises a video decoder.

Example 19. The device of any of examples 12-19, wherein the device comprises a video encoder.

Example 20. A computer-readable storage medium having stored thereon instructions that, when executed, cause one or more processors to perform the method of any of examples 1-11.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

What is claimed is:

1. A method of coding video data, the method comprising:
determining a value of a first variable that indicates whether a coding mode of a first block of the video data is in a set of applicable coding modes, wherein determining the value of the first variable comprises determining that the value of the first variable indicates that the coding mode of the first block is not in the set of applicable coding modes based on a determination that the coding mode of the first block is not a block-based delta pulse code modulation (BDPCM) mode, a determination that the coding mode of the first block is not a transform skip mode, and a determination that the coding mode of the first block is not a palette mode;
determining a value of a second variable that indicates whether a coding mode of a second block of the video data is in the set of applicable coding modes, wherein the second block is adjacent to the first block and determining the value of the second variable comprises determining that the value of the second variable indicates that the coding mode of the second block is not in the set of applicable coding modes based on a determination that the coding mode of the second block is not the BDPCM mode, a determination that the coding mode of the second block is not the transform skip mode, and a determination that the coding mode of the second block is not the palette mode; and
determining that a deblocking filter is disabled for a color component of at least one of the first block or the second block based on at least one of: the value of the first variable indicating that the coding mode of the first block is in the set of applicable coding modes or the value of the second variable indicating that the coding mode of the second block is in the set of applicable coding modes.

2. The method of claim 1, further comprising:
determining a value of a third variable that indicates whether a coding mode of a third block of the video data is in the set of applicable coding modes, wherein determining the value of the third variable comprises determining that the value of the third variable indicates that the coding mode of the third block is in the set of applicable coding modes based on a determination that the coding mode of the third block is one of a block-based delta pulse code modulation (BDPCM) mode, a transform skip mode, or a palette mode;
determining a value of a fourth variable that indicates whether a coding mode of a fourth block of the video data is in the set of applicable coding modes, wherein the fourth block is adjacent to the third block and determining the value of the fourth variable comprises determining that the value of the fourth variable indicates that the coding mode of the fourth block based on a determination that the coding mode of the fourth block is one of the BDPCM mode, the transform skip mode, or the palette mode; and determining that the deblocking filter is disabled for the color component of the third block and the fourth block based on either the value of the third variable indicating that the coding mode of the third block is in the set of applicable coding modes or the value of the fourth variable indicating that the coding mode of the fourth block is in the set of applicable coding modes.

3. The method of claim 1, further comprising:

determining a value of a third variable that indicates whether a coding mode of a third block of the video data is in the set of applicable coding modes, wherein determining the value of the third variable comprises determining that the value of the third variable indicates that the coding mode of the third block is in the set of applicable coding modes based on a determination that the coding mode of the third block is one of a block-based delta pulse code modulation (BDPCM) mode, a transform skip mode, or a palette mode;

determining a value of a fourth variable that indicates whether a coding mode of a fourth block of the video data is in the set of applicable coding modes, wherein the fourth block is adjacent to the third block and determining the value of the fourth variable comprises determining that the value of the fourth variable indicates that the coding mode of the fourth block based on a determination that the coding mode of the fourth block is one of the BDPCM mode, the transform skip mode, or the palette mode; and determining that the deblocking filter is disabled for the color component of the third block and the fourth block based on both the value of the third variable indicating that the coding mode of the third block is in the set of applicable coding modes and the value of the fourth variable indicating that the coding mode of the fourth block is in the set of applicable coding modes.

4. The method of claim 1, further comprising:

determining a value of a third variable that indicates whether a coding mode of a third block of the video data is in the set of applicable coding modes, wherein determining the value of the third variable comprises determining that the value of the third variable indicates that the coding mode of the third block is in the set of applicable coding modes based on a determination that the coding mode of the first third block is one of a block-based delta pulse code modulation (BDPCM) mode, a transform skip mode, or a palette mode;

determining a value of a fourth variable that indicates whether a coding mode of a fourth block of the video data is in the set of applicable coding modes, wherein the fourth block is adjacent to the third block and determining the value of the fourth variable comprises determining that the value of the fourth variable indicates that the coding mode of the fourth block based on a determination that the coding mode of the fourth block is one of the BDPCM mode, the transform skip mode, or the palette mode; and determining that the deblocking filter is disabled for the color component of the third block based on the value of the third variable indicating that the coding mode of the third block is in the set of applicable coding mode and determining that the value of the fourth variable indicates that the deblocking filter is disabled for the fourth block based on the value of the fourth variable indicating that the coding mode of the fourth block is in the set of applicable coding modes.

5. The method of claim 1, wherein:

the color component is a luma component, the coding mode of the first block is a coding mode for the luma component of the first block, the coding mode of the second block is a coding mode for the luma component of the second block, the method further comprises:

determining whether a coding mode of a chroma component of the first block is in the set of applicable coding modes;

determining whether a coding mode of the chroma component of the second block is in the set of applicable coding modes; and determining that the deblocking filter is disabled for at least one of the chroma component of the first block and the chroma component of the second block based on at least one of: the coding mode of the chroma component of the first block being in the set of applicable coding modes and the coding mode of the chroma component of the second block being in the set of applicable coding modes.

6. The method of claim 1, wherein the set of applicable coding modes includes an intra coded transform skip mode and not an inter coded transform skip mode.

7. The method of claim 1, wherein the set of applicable coding modes includes one or more coding modes that do not use transform skip.

8. The method of claim 7, wherein the one or more coding modes that do not use transform skip include an intra block copy mode.

9. The method of claim 1, further comprising determining not to disable a step of determining that the deblocking filter is disabled for the color component of at least one of the first block or the second block based on one or more of:

a syntax element in a sequence parameter set, a picture parameter set, or a slice, a quantization parameter of the slice, the picture parameter set, or the sequence parameter set, a slice type, or a block size of the first block or the second block.

10. The method of claim 1, wherein:

coding comprises decoding, and the method further comprises:

obtaining a bitstream that includes an encoded representation of the first block and an encoded representation of the second block; and reconstructing the first block and the second block based on the encoded representation of the first block and the encoded representation of the second block.

11. The method of claim 1, wherein:

coding comprises encoding, and the method further comprises including an encoded representation of the first block and an encoded representation of the second block in a bitstream that includes an encoded representation of the video data.

12. A device for coding video data, the device comprising:

a memory to store the video data; and one or more processors implemented in circuitry, the one or more processors configured to:

determine a value of a first variable that indicates whether a coding mode of a first block of the video data is in a set of applicable coding modes, wherein determining the value of the first variable comprises determining that the value of the first variable indicates that the coding mode of the first block is not in the set of applicable coding modes based on a determination that the coding mode of the first block is not a block-based delta pulse code modulation (BDPCM) mode, a determination that the coding mode of the first block is not a transform skip mode, and a determination that the coding mode of the first block is not a palette mode;

determine a value of a second variable that indicates whether a coding mode of a second block of the video data is in the set of applicable coding modes, wherein the second block is adjacent to the first block and determining the value of the second variable comprises determining that the value of the second variable indicates that the coding mode of the second block is not in the set of applicable coding modes based on a determination that the coding mode of the second block is not the BDPCM mode, a determination that the coding mode of the second block is not the transform skip mode, and a determination that the coding mode of the second block is not the palette mode; and determine that a deblocking filter is disabled for a color component of at least one of the first block or the second block based on at least one of: the value of the first variable indicating that the coding mode of the first block is in the set of applicable coding modes or the value of the second variable indicating that the coding mode of the second block is in the set of applicable coding modes.

13. The device of claim 12, wherein the one or more processors are further configured to:

determine a value of a third variable that indicates whether a coding mode of a third block of the video data is in the set of applicable coding modes, wherein determining the value of the third variable comprises determining that the value of the third variable indicates that the coding mode of the third block is in the set of applicable coding modes based on a determination that the coding mode of the third block is one of a block-based delta pulse code modulation (BDPCM) mode, a transform skip mode, or a palette mode;

determine a value of a fourth variable that indicates whether a coding mode of a fourth block of the video data is in the set of applicable coding modes, wherein the fourth block is adjacent to the third block and determining the value of the fourth variable comprises determining that the value of the fourth variable indicates that the coding mode of the fourth block based on a determination that the coding mode of the fourth block is one of the BDPCM mode, the transform skip mode, or the palette mode; and determine that the deblocking filter is disabled for the color component of the third block and the fourth block based on either the value of the third variable indicating that the coding mode of the third block is in the set of applicable coding modes or the value of the fourth variable indicating that the coding mode of the fourth block is in the set of applicable coding modes.

14. The device of claim 12, wherein the one or more processors are further configured to:

determine a value of a third variable that indicates whether a coding mode of a third block of the video data is in the set of applicable coding modes, wherein determining the value of the third variable comprises determining that the value of the third variable indicates that the coding mode of the third block is in the set of applicable coding modes based on a determination that the coding mode of the third block is one of a block-based delta pulse code modulation (BDPCM) mode, a transform skip mode, or a palette mode;

determine a value of a fourth variable that indicates whether a coding mode of a fourth block of the video data is in the set of applicable coding modes, wherein the fourth block is adjacent to the third block and determining the value of the fourth variable comprises determining that the value of the fourth variable indicates that the coding mode of the fourth block based on a determination that the coding mode of the fourth block is one of the BDPCM mode, the transform skip mode, or the palette mode; and determine that the deblocking filter is disabled for the color component of the third block and the fourth block based on both the value of the third variable indicating that the coding mode of the third block is in the set of applicable coding modes and the value of the fourth variable indicating that the coding mode of the fourth block is in the set of applicable coding modes.

15. The device of claim 12, wherein the one or more processors are further configured to:

determine a value of a third variable that indicates whether a coding mode of a third block of the video data is in the set of applicable coding modes, wherein determining the value of the third variable comprises determining that the value of the third variable indicates that the coding mode of the third block is in the set of applicable coding modes based on a determination that the coding mode of the third block is one of a block-based delta pulse code modulation (BDPCM) mode, a transform skip mode, or a palette mode;

determine a value of a fourth variable that indicates whether a coding mode of a fourth block of the video data is in the set of applicable coding modes, wherein the fourth block is adjacent to the third block and determining the value of the fourth variable comprises determining that the value of the fourth variable indicates that the coding mode of the fourth block based on a determination that the coding mode of the fourth block is one of the BDPCM mode, the transform skip mode, or the palette mode; and determine that the deblocking filter is disabled for the color component of the first third block based on the value of the third variable indicating that the coding mode of the first third block being in the set of applicable coding mode and determining that the value of the fourth variable indicates that the deblocking filter is disabled for the fourth block based on the value of the fourth variable indicating that the coding mode of the fourth block is in the set of applicable coding modes.

16. The device of claim 12, wherein:

the color component is a luma component, the coding mode of the first block is a coding mode for the luma component of the first block, the coding mode of the second block is a coding mode for the luma component of the second block, the one or more processors are further configured to:

determine whether a coding mode of a chroma component of the first block is in the set of applicable coding modes;

determine whether a coding mode of the chroma component of the second block is in the set of applicable coding modes; and determine that the deblocking filter is disabled for at least one of the chroma component of the first block and the chroma component of the second block based on at least one of: the coding mode of the chroma component of the first block being in the set of applicable coding modes and the coding mode of the chroma component of the second block being in the set of applicable coding modes.

17. The device of claim 12, wherein the set of applicable coding modes includes an intra coded transform skip mode and not an inter coded transform skip mode.

18. The device of claim 12, wherein the set of applicable coding modes includes one or more coding modes that do not use transform skip.

19. The device of claim 18, wherein the one or more coding modes that do not use transform skip include an intra block copy mode.

20. The device of claim 12, wherein the one or more processors are further configured to determine whether to disable a step of determining that the deblocking filter is disabled for the color component of at least one of the first block or the second block based on one or more of:
 a syntax element in a sequence parameter set, a picture parameter set, or a slice,
 a quantization parameter of the slice, the picture parameter set, or the sequence parameter set,
 a slice type, or
 a block size of the first block or the second block.

21. The device of claim 12, wherein:
 the device comprises a video decoder, and
 the one or more processors are configured to:
  obtain a bitstream that includes an encoded representation of the first block and an encoded representation of the second block; and
  reconstruct the first block and the second block based on the encoded representation of the first block and the encoded representation of the second block.

22. The device of claim 12, wherein:
 the device comprises a video encoder, and
 the one or more processors are configured to include an encoded representation of the first block and an encoded representation of the second block in a bitstream that includes an encoded representation of the video data.

23. The device of claim 12, wherein the circuitry comprises an integrated circuit.

24. The device of claim 12, further comprising a display configured to display decoded video data.

25. The device of claim 12, wherein the device comprises one or more of a camera, a computer, a mobile device, a broadcast receiver device, or a set-top box.

26. A device for coding video data, the device comprising:
 means for determining a value of a first variable that indicates whether a coding mode of a first block of the video data is in a set of applicable coding modes, wherein determining the value of the first variable comprises determining that the value of the first variable indicates that the coding mode of the first block is not in the set of applicable coding modes based on a determination that the coding mode of the first block is a block-based delta pulse code modulation (BDPCM) mode, a determination that the coding mode of the first block is not a transform skip mode, and a determination that the coding mode of the first block is not a palette mode;
 means for determining a value of a second variable that indicates whether a coding mode of a second block of the video data is in the set of applicable coding modes, wherein the second block is adjacent to the first block and determining the value of the second variable comprises determining that the value of the second variable indicates that the coding mode of the second block is not in the set of applicable coding modes based on a determination that the coding mode of the second block is not the BDPCM mode, a determination that the coding mode of the second block is not the transform skip mode, and a determination that the coding mode of the second block is not the palette mode; and
 means for determining that a deblocking filter is disabled for a color component of at least one of the first block or the second block based on at least one of: the value of the first variable indicating that the coding mode of the first block is in the set of applicable coding modes or the value of the second variable indicating that the coding mode of the second block is in the set of applicable coding modes.

27. A non-transitory computer-readable storage medium having stored thereon instructions that, when executed, cause one or more processors to:
 determine a value of a first variable that indicates whether a coding mode of a first block of the video data is in a set of applicable coding modes, wherein determining the value of the first variable comprises determining that the value of the first variable indicates that the coding mode of the first block is not in the set of applicable coding modes based on a determination that the coding mode of the first block is not a block-based delta pulse code modulation (BDPCM) mode, a determination that the coding mode of the first block is not a transform skip mode, and a determination that the coding mode of the first block is not a palette mode;
 determine a value of a second variable that indicates whether a coding mode of a second block of the video data is in the set of applicable coding modes, wherein the second block is adjacent to the first block and determining the value of the second variable comprises determining that the value of the second variable indicates that the coding mode of the second block is not in the set of applicable coding modes based on a determination that the coding mode of the second block is not the BDPCM mode, a determination that the coding mode of the second block is not the transform skip mode, and a determination that the coding mode of the second block is not the palette mode; and
 determine that a deblocking filter is disabled for a color component of at least one of the first block or the second block based on at least one of: the value of the first variable indicating that the coding mode of the first block is in the set of applicable coding modes or the value of the second variable indicating that the coding mode of the second block is in the set of applicable coding modes.

* * * * *